Aug. 16, 1938.  H. W. COLE  2,127,391

WINDSHIELD DEFROSTER ATTACHING AND RETAINING MEANS

Filed Jan. 4, 1938    3 Sheets—Sheet 1

Inventor

Howard W. Cole

By Clarence A. O'Brien
Hyman Berman
Attorneys

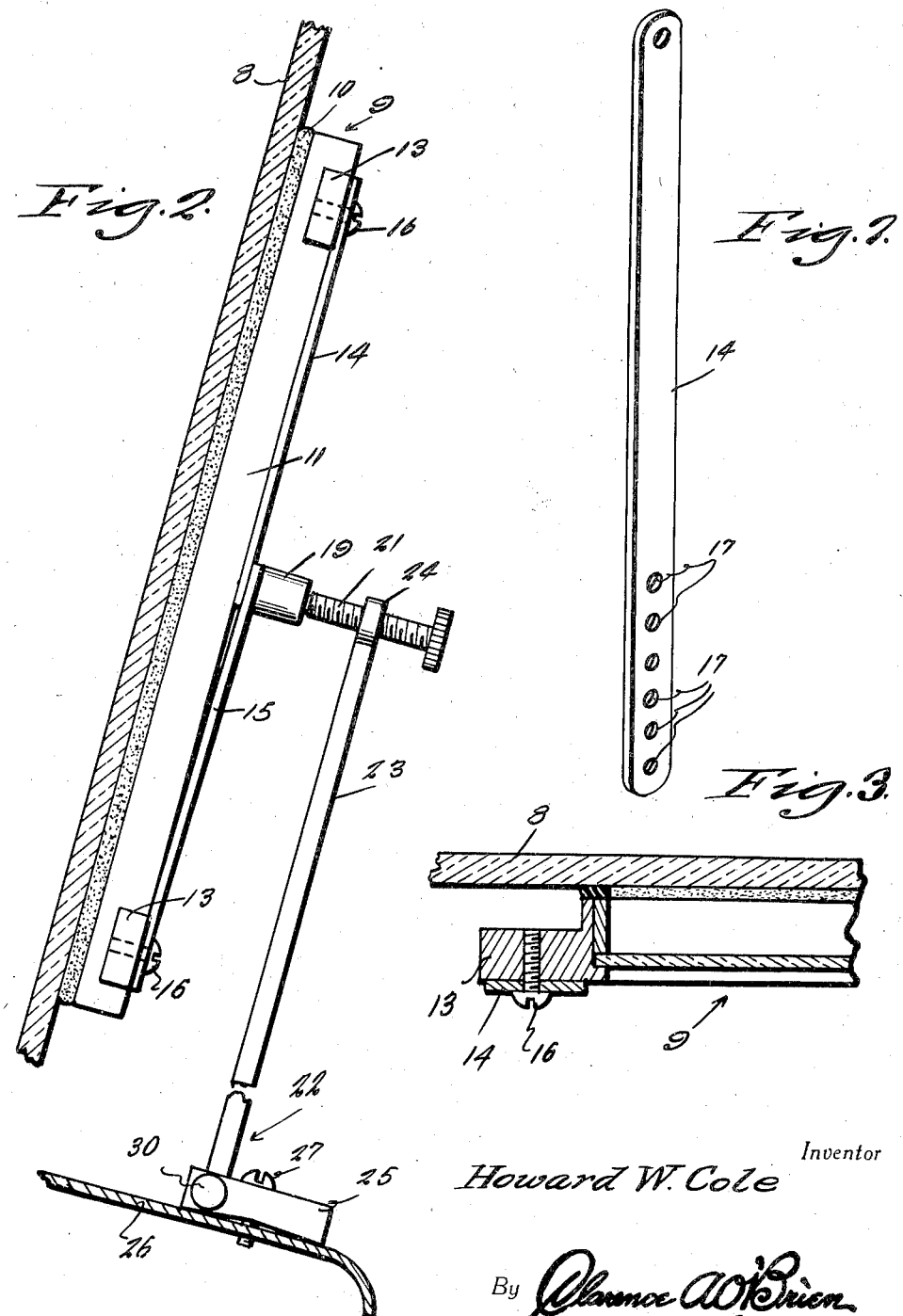

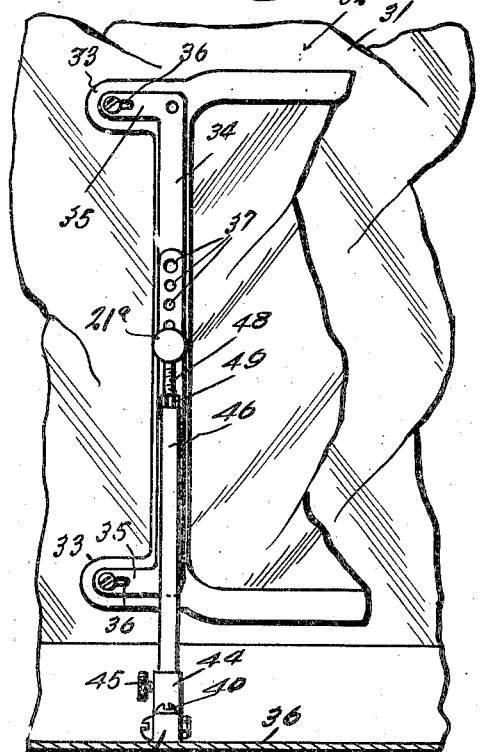

Patented Aug. 16, 1938

2,127,391

UNITED STATES PATENT OFFICE 2,127,391

WINDSHIELD DEFROSTER ATTACHING AND RETAINING MEANS

Howard W. Cole, Conyngham, Pa.

Application January 4, 1938, Serial No. 183,354

7 Claims. (Cl. 20—40.5)

The present invention relates to mechanically new and novel supporting and retaining means for what may be described as a coventional type windshield defroster, and the principal purpose of the invention is to dispense with the rubber suction cups generally used for this purpose, and to substitute therefor more satisfactory and reliable retention means.

As a general proposition, a windshield defroster embodies a glass panel supporting frame, the latter having outstanding lugs provided with rubber suction cups constituting the sole means for attaching the defroster to the windshield. I have found such attaching means unreliable, and have therefore perfected what is believed to be a more adequate and reliable assemblage insuring effective maintenance of the defroster.

Briefly, the preferred embodiment of the invention comprises pairs of adapted links, these being attached to the existing lugs on the defroster and equipped to accommodate adjustable thrust screws supported from suitably designed supporting fixtures or units.

Stated otherwise, the novelty in chief is predicated upon a pair of stands or equivalent fixtures, these being susceptible of adjustable connection with the cowl and having set screws and accommodation means whereby to afford a connection between the stand and the frame of the defroster to hold the defroster securely in place while permitting its removal whenever necessary or desired.

Other features and advantages will become more readily apparent from the following description and drawings.

In the drawings:

Figure 2 is an enlarged section on the line 2—2 of Figure 1.

Figure 3 is an enlarged fragmentary horizontal section on the line 3—3 of Figure 1.

Figure 1:
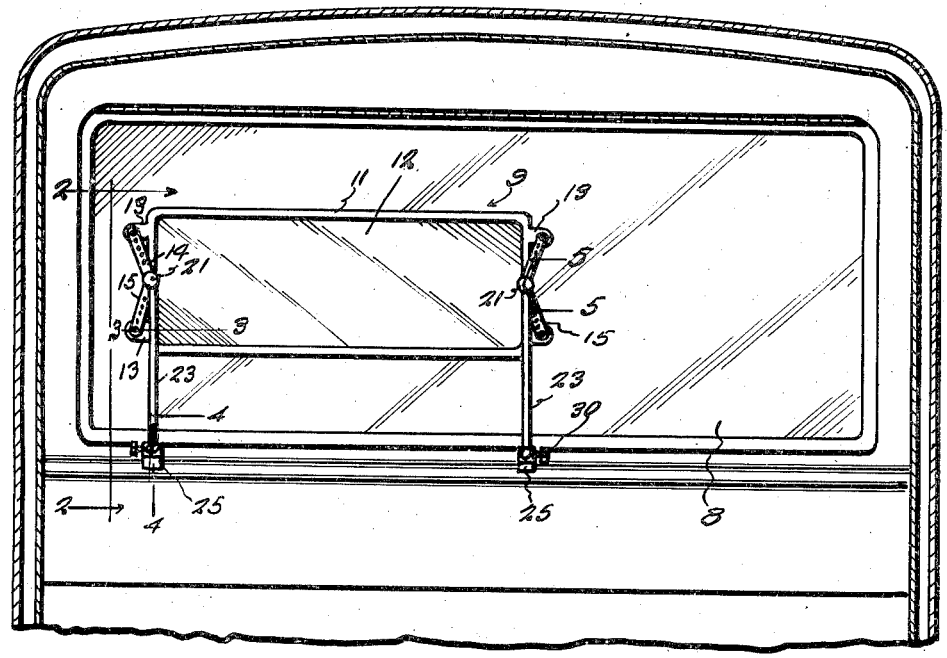
Figure 1 is a fragmentary view of a portion of an automobile showing the windshield, the defroster, and the improved supporting and retaining means for said defroster.
Figure 4:
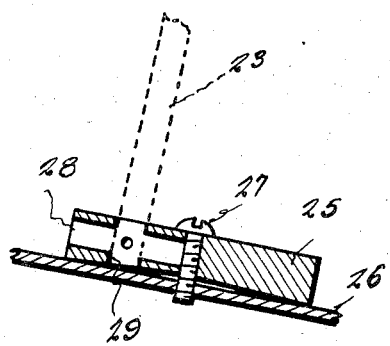
Figure 5:
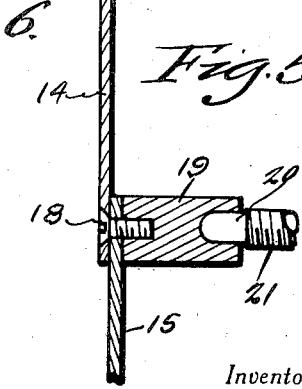

Figures 4 and 5 are detail sections on the lines 4—4 and 5—5 respectively, of Figure 1.

Figure 6:
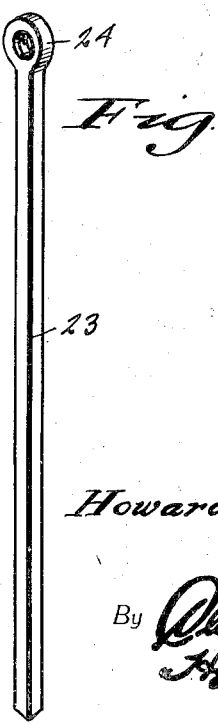

Figures 6 and 7 are perspective views of certain of the details.

Figure 8 is a fragmentary view showing a portion of an automobile windshield, the cowl, the defroster and a modified link and supporting stand arrangement.

Figure 9 is what may be called an edge view of Figure 8, that is a view observing it in a direction from left to right, portions being broken away and shown in section for clearness of illustration.

Figure 10 is a detail view of one of the L-shaped apertured adapter links.

Figure 11 is a view showing the adjustable eye forming a part of the stand unit or fixture.

Figure 12 is a further modification showing the end thrust block bracket or adapter member secured directly to the marginal frame of the defroster.

Figure 13 is a view looking at Figure 12 in a direction from right to left.

In Figures 1 to 7, the wind-shield is denoted by the numeral 8 and the defroster is indicated generally by the numeral 9. It includes the customary gasket or packing 10, frame 11, glass panel 12, and supporting lugs 13 on the end portions of the frame. Usually these lugs are provided with rubber suction cups and it is my idea to dispense with such cups. Instead I use adapter links, these being of duplicate construction and denoted by the numerals 14 and 15. The links are screwed or otherwise fastened at their outer ends as indicated at 16 to the respective lugs. The inner overlapping ends of the links are provided with a plurality of bolt holes as indicated at 17. This arrangement serves to accommodate a screw or the like 18 as shown in Figure 5 which in turn holds in place the end thrust and supporting block 19. The block is formed with a socket to accommodate a detent 20 on the end of the set screw 21. These parts are utilized in pairs as is evident from the drawings, and since the parts are duplicate, a description of one arrangement will suffice for both. That is to say, each set screw is supported through the instrumentality of an adjustable fixture or stand 22. The stand comprises a standard 23 having a threaded eye 24 at its upper end to accommodate the set screw. The standard is detachably connected at its lower end with an anchoring block 25 attachable to the inner cowl 26. The base block is secured to the cowl by way of a fastening screw 27 and the block may be disposed either horizontally or vertically depending on the formation of the inner cowl 26. For this reason, the block has a longitudinal socket 28 (see Figure 4) intersected by a transverse or cross socket 29. If the block is attached in a substantially vertical position the standard 23 slips into the socket 28. If it is attached horizontally as shown in Figure 4, the standard slips into the cross socket 29 as brought out in dotted lines in this figure.

Briefly then, it will be observed that the adapter links are attached to the ends of the frame of the defroster. The links join together at their inner overlapping ends by the features 18 and 19 shown in Figure 5. This provides an end thrust socket and retention arrangement to accommodate the set screw in each instance. The set screw in turn is adjustably supported on the stand 22. The stand is variable to the extent described and characterized by a simple standard and base or anchoring block. Any suitable fastening such as the set screw 30 (see Figure 2) is utilized to adjoin the standard to the block 25.

Under certain conditions it is to be observed that the thrust member 19 instead of being connected with the links 14 and 15 may be connected directly to one of the lugs 13. This is true wherein the defroster frame merely has a set of two lugs and these are arranged centrally of the end bars of the frame. In other words, in some instances the defroster frame has four lugs as shown, and in other instances merely a pair of lugs and these are centrally disposed. Under this arrangement the screw 18 is simply threaded through the existing bolt hole in the lug, in an obvious manner, to secure the part 19 thereto somewhat in the same way as is illustrated in Figure 5 of the drawings.

Reference being had now to Figures 8, 9, 10 and 11, it will be observed that a modification of the invention is illustrated. Although there are certain fundamental or common features, it is apparently advisable to describe the structure anew. Here the windshield 31 appears in conjunction with the defroster 32, the defroster having the aforementioned lugs 33. There are two links in each end in this arrangement, and the links are of L-shaped form and indicated at 34. The laterally directed ends 35 have slots 36 to accommodate the fastenings as shown. The overlapped shank portions of the respective links are provided with a series of holes 37 adapted to be adjustably connected together by the thrust socket unit 19a. The set screw 21a has its end portion designed to slip into the thrust socket as already described.

The stand unit in this arrangement is distinguished by the numeral 38. There is a bracket 39 for connection to the windshield cowl 26, this being fastened in place by a suitable fastening 40. One end is bifurcated and the furcations 41 serve to accommodate a pivot and assembling bolt 42 which serves to attach in place the shank 43 of a socket member 44. The socket member is provided with a set screw 45 which serves to hold therein the upright or rod 46, the latter having a socket in its upper end and said socket being screw threaded as at 47 in Figure 11.

In this arrangement the eye which serves to accommodate the aforementioned set screw or thrust screw 21a is here indicated at 24a and the eye is screw threaded and is carried by a shank 48 threaded into the socket 47 and held therein by a lock nut 49.

In the further modification seen in Figure 12 the thrust socket 19 is fastened directly by a suitable fastening 50 directly to the frame of the defroster. In other words, in this arrangement, instead of attaching the socket to an existing lug on the defroster frame, the adapter member 19 is fastened directly to the frame and this disposes the cavity or socket in a position to accommodate the thrust screw 21 as already brought out.

It is thought that the description taken in connection with the drawings will enable a clear understanding of the invention to be had. Therefore, a more lengthly description is thought unnecessary.

While the preferred embodiment of the invention has been shown and described, it is to be understood that minor changes coming within the field of invention claimed may be resorted to if desired.

I claim:

1. In a structure of the class described, in combination, a windshield, an inner cowl, a defroster including a marginal frame, adapter links connected to the end portions of said frame, a pair of stand units attached to said cowl, and set screws carried by said stand units and connected with said links.

2. In a structure of the class described, a defroster comprising a frame having outstanding lugs at opposite ends, pairs of links detachably connected at their outer ends to adjacent lugs, the inner ends of the respective pairs of links being adjustably adjoined together in overlapping relationship, a thrust and set screw cooperable with each pair of links, and fixtures for supporting the set screws from an underlying relatively fixed cowl.

3. Attaching means for a windshield defroster comprising a pair of links having their inner ends disposed in slidable overlapping relationship, a thrust socket carried by said inner ends, a set screw having one end fitting into said thrust socket, a standard having an eye threaded to accommodate said set screw, an anchoring block attachable to a windshield cowl, and selectively usable connecting means between the standard and block.

4. As a component part of an assemblage of the class described, a pair of attaching links, adjustable connecting means connecting the inner ends of the links together and including a socket, a set screw engageable in said socket, and a supporting fixture for the set screw.

5. As a component part of an assemblage of the class described, an anchoring block attachable to a windshield cowl, said block having selectively usable sockets, a supporting rod selectively insertable into said sockets, said supporting rod being provided with a screw threaded eye, and a set screw threaded through said eye.

6. As a new article of manufacture and as a component part of a construction of the class described, a stand unit adapted to accommodate a thrust screw and comprising an attaching block having fastening means adapted for connection with a windshield cowl, said block being bifurcated, a socket having a shank pivotally mounted between said furcations, an upright fitting into said shank, an eye also threaded in said rod and a lock nut for maintaining the eye in place.

7. In a construction of the class described, a tubular rod screw-threaded at one end, an eye including a screw-threaded shank threaded into said rod, said eye being adapted to accommodate a thrust screw, a socket telescopically receiving the opposite end of said rod, a set screw for maintaining the rod in place, said socket having a shank, an anchoring block, said block being bifurcated and said shank being pivotally mounted between said furcations.

HOWARD W. COLE.